United States Patent
Billmaier et al.

(10) Patent No.: US 8,240,734 B2
(45) Date of Patent: Aug. 14, 2012

(54) ATTACHMENT ELEMENT

(75) Inventors: Walter Billmaier, Rüsselsheim (DE);
Thomas Ackermann, Montabaur (DE);
Stefan Schüssler, Trebur (DE); Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 12/061,389

(22) Filed: Apr. 2, 2008

(65) Prior Publication Data

US 2008/0238129 A1    Oct. 2, 2008

(30) Foreign Application Priority Data

Apr. 2, 2007 (DE) .................... 10 2007 015 866

(51) Int. Cl.
*B62D 33/00* (2006.01)

(52) U.S. Cl. ......................... 296/39.3; 296/72

(58) Field of Classification Search .................... 296/29, 296/37.12, 70, 72, 39.3; 180/90; 248/27.1, 248/27.3; 411/82, 339
See application file for complete search history.

(56) References Cited

U.S. PATENT DOCUMENTS

| | | | | |
|---|---|---|---|---|
| 3,435,702 | A * | 4/1969 | Smith | 74/552 |
| 3,645,162 | A | 2/1972 | Welch | |
| 4,485,510 | A | 12/1984 | Hatter | |
| 5,613,406 | A * | 3/1997 | Rutkowski | 74/502.6 |
| 6,132,154 | A * | 10/2000 | Easter | 411/508 |
| 6,484,370 | B2 * | 11/2002 | Kanie et al. | 24/297 |
| 6,604,780 | B2 * | 8/2003 | Lee | 296/192 |
| 6,634,693 | B2 * | 10/2003 | Straesser, Jr. | 296/70 |
| 2006/0017306 | A1 * | 1/2006 | Smith et al. | 296/146.7 |

FOREIGN PATENT DOCUMENTS

| | | |
|---|---|---|
| DE | 3300676 A1 | 7/1983 |
| DE | 29701805 U1 | 3/1997 |
| GB | 2310169 A | 8/1997 |
| WO | 9916642 A1 | 4/1999 |

OTHER PUBLICATIONS

German Patent Office, German Search Report for German Application No. 102007015866.3, dated Nov. 13, 2007.
European Patent Office, European Search Report for European Application No. 080050776, dated Jul. 30, 2008.

* cited by examiner

*Primary Examiner* — Dennis Pedder
*Assistant Examiner* — Pinel Romain
(74) *Attorney, Agent, or Firm* — Ingrassia Fisher & Lorenz, P.C.

(57) ABSTRACT

An attachment element is provided with a central cylinder. The first end of the central cylinder has an internal thread and the other end terminates with an outer disk, where it can be screwed down, and passes through an inner disk between the outer disk and its first end.

8 Claims, 4 Drawing Sheets

ATTACHMENT ELEMENT

CROSS-REFERENCE TO RELATED APPLICATION

This application claims priority to German Patent Application No. DE 102007015866.3, filed Apr. 2, 2007, which is incorporated herein by reference in its entirety.

TECHNICAL FIELD

The invention relates to an attachment element for attaching an instrument panel to the front wall of a motor vehicle, in particular a passenger vehicle.

BACKGROUND

During the assembly of a motor vehicle, the instrument panel must be joined with the front wall in a suitable manner. Numerous attachment means have become established in practice for this purpose. Among other things, they are characterized by the fact that the sound insulation performs unsatisfactory, many components are required or the outlay for joining is high.

At least one object of one of the embodiments of the invention is to provide an attachment element for affixing an instrument panel to the front wall of a motor vehicle, which enables the assembly of the instrument panel with as few parts as possible, improves the sound insulation of the motor vehicle, and makes assembly especially quick and easy. In addition, other objects desirable features and characteristics of invention embodiments will become apparent from the subsequent detailed description and the appended claims, taken in conjunction with the accompanying drawings, summary, background and abstract.

SUMMARY

One first aspect of the invention relates to an attachment element with a central cylinder, the first end of which has an internal thread, and the second end of which terminates with a disk, hereinafter referred to as outer disk, where it can be screwed down, and passes through another disk, hereinafter referred to as inner disk, between the outer disk and its first end.

The attachment element can be screwed onto a weld screw by means of the internal thread. Another part can be clamped between the component having the weld screw and the inner disk. If the component is the front wall of a passenger vehicle, sound insulation can be clamped between the inner disk that is rigidly joined with the cylinder and the front wall. To this end, the sound insulation has an opening that is larger than the cylinder diameter and smaller than the inner disk, so that the sound insulation is pressed against the front wall at its opening while screwing the attachment element onto the weld screw. This prevents having to cut out a portion of the sound insulation in the area of the attachment element for assembly reasons, maximizes the front wall surface that can be provided with sound insulation, and hence yields especially low noise inside the vehicle. At the same time, the sound insulation is solidly secured.

The outer disk arranged on the outermost end of the cylinder can be used to join another component with the component having the weld screw. The other component can exhibit a pocket into which the outer disk can be introduced to secure it in the longitudinal direction of the cylinder. If the other component is an instrument panel, for example, it can be prevented from shifting opposite the longitudinal direction of the motor vehicle and in a vertical direction in this way. As a result, the instrument panel can be easily fixed to the front wall without any ancillary means, such as a screw nut. Therefore, only one attachment element is required to secure two components to the weld screw. The attachment element here represents a combined screwed and plug-in connection, with which the mentioned components can be joined with little assembly outlay.

In a second embodiment, the attachment element, which can be made out of plastic, consist of two circular disks, so that the position of the disks is not important during assembly.

The attachment element can be designed so that it can be screwed in the area of the outer disk, for example, by having the cylinder be a hexagon socket. As an alternative to the above, another embodiment provides for the screwing capacity by having the outer disk occupy a depression on the outside, where the cylinder is designed as a hexagon insert bit.

As explained above, the outer disk can be used to secure another component by introducing it into a corresponding pocket of the other component, or running the pocket over the outer disk laterally reversed. As a result, a certain play might then cause the outer disk to rattle against the pocket walls. To prevent this, another embodiment provides that the plastic attachment element be provided with spring elements molded on the outer disk, which have an outwardly curved contact surface, held by a notch-shaped elastic element. To this end, the spring elements are located in outwardly open openings of the outer disk, and extend slightly over it without mechanical load. Therefore, the contact surface of a spring element hits the pocket wall during use, offsetting the existing play inside the pocket.

Another aspect of the invention relates to a motor vehicle with a weld screw secured to its front wall. An attachment element according to one of the embodiments described above is screwed onto the weld screw. The inner disk of the attachment element presses sound insulation against the front wall, and the outer disk secures an instrument panel to the front wall. As described above, the instrument panel can have a corresponding pocket to this end, for example as a U-shaped recess, so that the instrument panel is moved or introduced toward the front wall during assembly, so that the attachment element is inserted into the pocket. To simplify the assembly operation, the weld screws can here be aligned vertically, since the instrument panel can then be moved horizontally.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
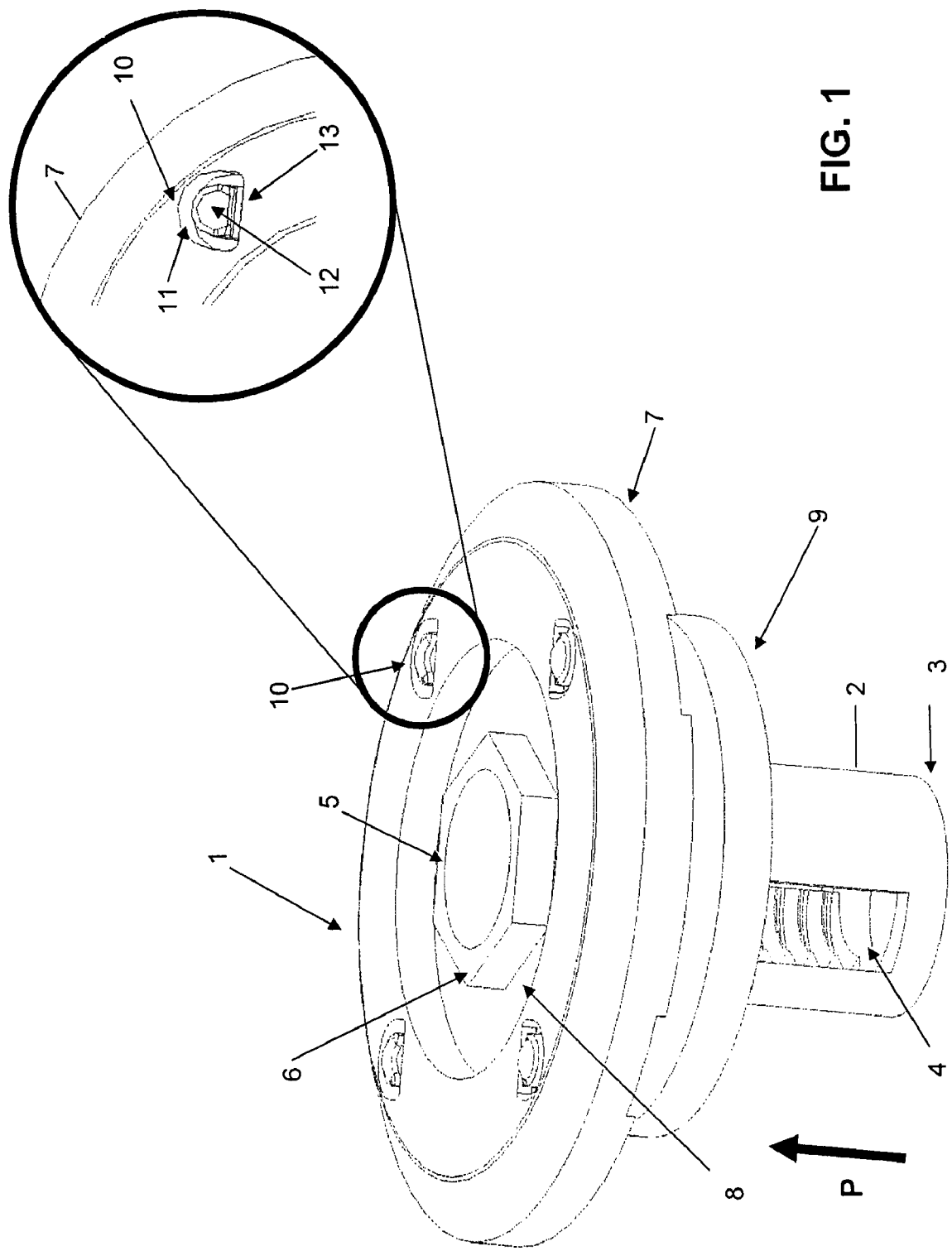
FIG. 1 is a perspective side view of an embodiment of an attachment element.

In the figures, which generally denote the same items using the same reference numbers, FIG. 1 shows a plastic attachment element 1, which centrally has a cylinder 2. The cylinder 2 has an internal thread 4 at one end 3. It can be screwed at the other end 5 by means of a hexagon insert bit 6.

The other end 5 of the cylinder 2 is provided with an outer circular disk 7. The outer disk 7 has a depression 8 that buts flush with the end 5 of the cylinder 2. Situated between the outer disk 7 and one end 3 is an inner circular disk 9. The diameter of the outer disk 7 is greater than the diameter of the inner disk 9.

The outer surface of the outer disk 7 of the attachment element 1 has spring elements 10, which are enlarged in the magnified section A. The spring element 10 is incorporated into an opening 11 of the outer disk 7, and has an upwardly curved contact surface 12 that is molded via a notch-shaped elastic element 13 to the edge of the opening 11 or the outer disk 7.

Figure 2:
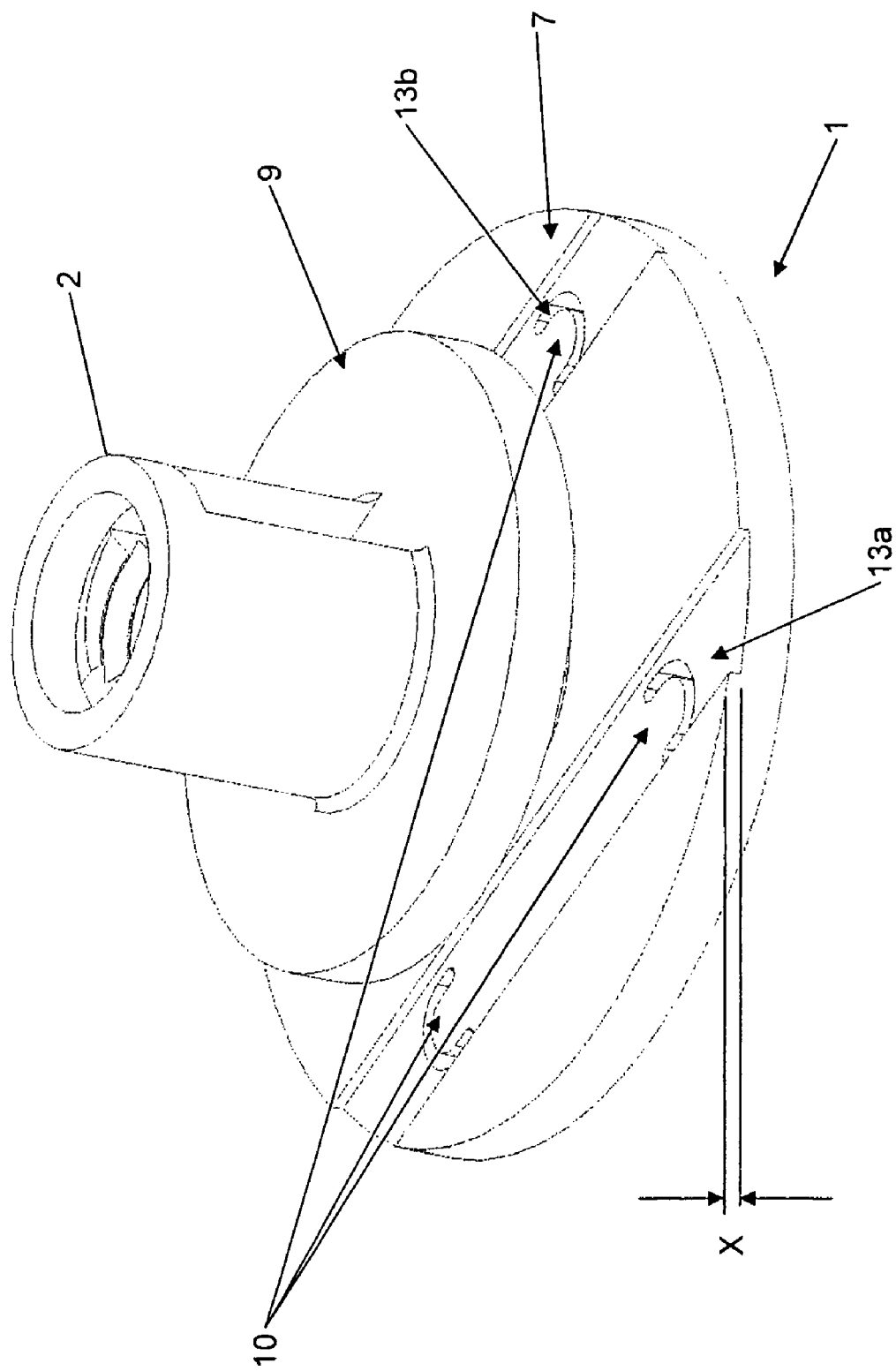
FIG. 2 is the attachment element of FIG. 1 with a view of the bottom side.

FIG. 2 shows the attachment element 1 of FIG. 1 from the bottom, i.e., viewed in the direction of the arrow P on FIG. 1. As evident, the bottom side has two strip-shaped recesses 13a, 13b in the area of the spring elements 10, i.e., it is lowered by a specific distance x. Correspondingly, the contact surfaces 11 of the spring elements 10 project by the same distance x over the outer surface of the outer disk 7. As will be explained below, the spring elements 10 are used to offset the play inside the receiving pocket. In this regard, the height of the recesses 13a, 13b can also be sued to flexibly offset the expected location deviations.

Figure 3:
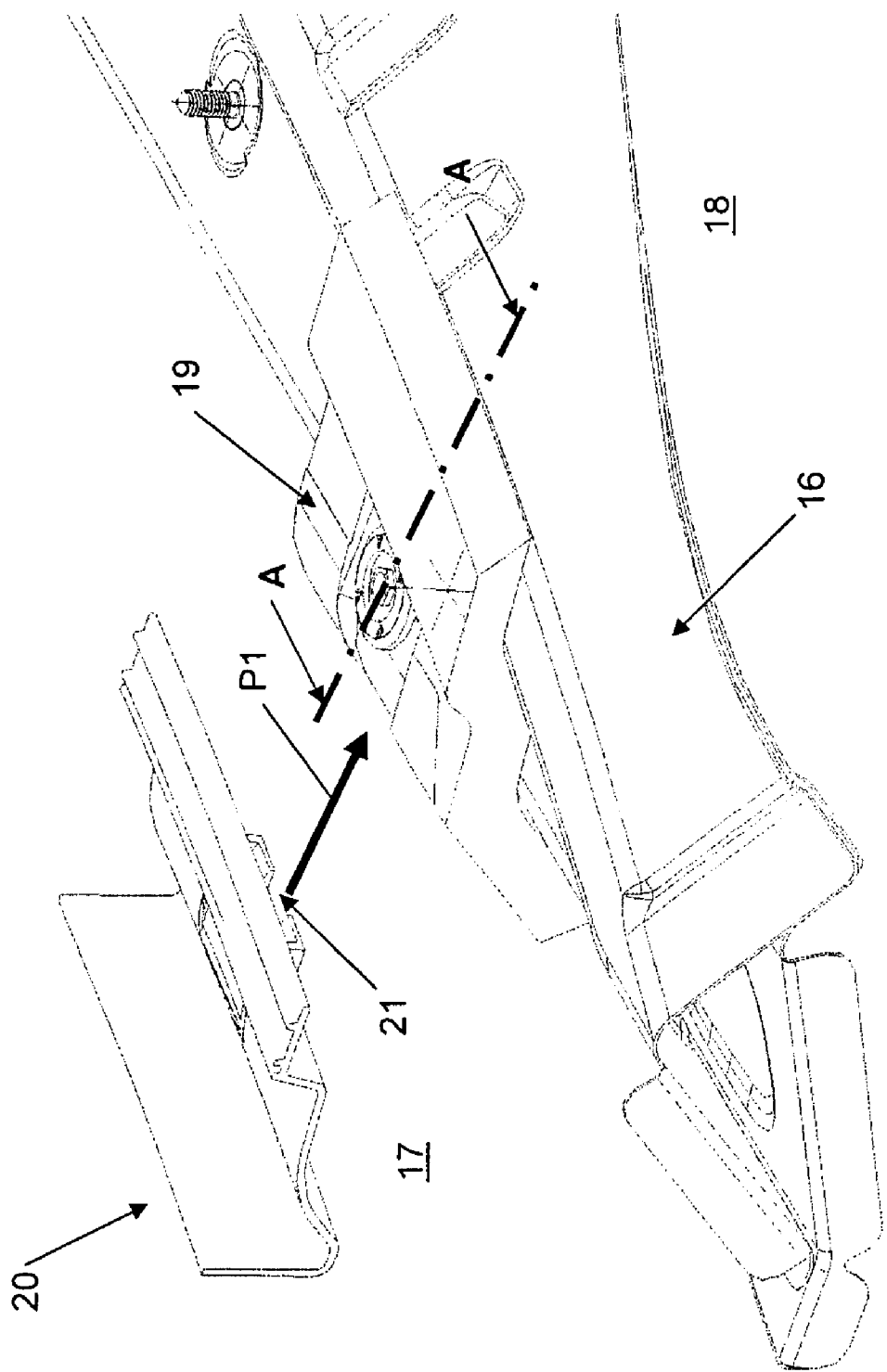
FIG. 3 is the assembly area of the attachment element of FIG. 1 and 2.

FIG. 3 shows a front wall that separates the engine compartment 18 of a motor vehicle (not shown) from the passenger compartment 17. The attachment element 1 is used to clamp the sound insulation 19 between the inner disk 9 of the attachment element 1 and the front wall 16. An instrument panel 20 shown only in a sectional view has a U-shaped pocket 21, which is moved in the direction of the arrow P1 during assembly. The outer disk 7 moves into the pocket 21 in the process, thereby securing the instrument panel 20 in a vertical direction. As shown on FIG. 3, a single attachment element 1 can be used to secure both the sound insulation 19 and the instrument panel 20 to the front wall 16. Assembly can here be easily performed with a hexagon insert bit and a shifting operation. No additional securing means or the like are required. The danger of incorrect assembly, and hence malfunction during assembly, is slight.

Figure 4:
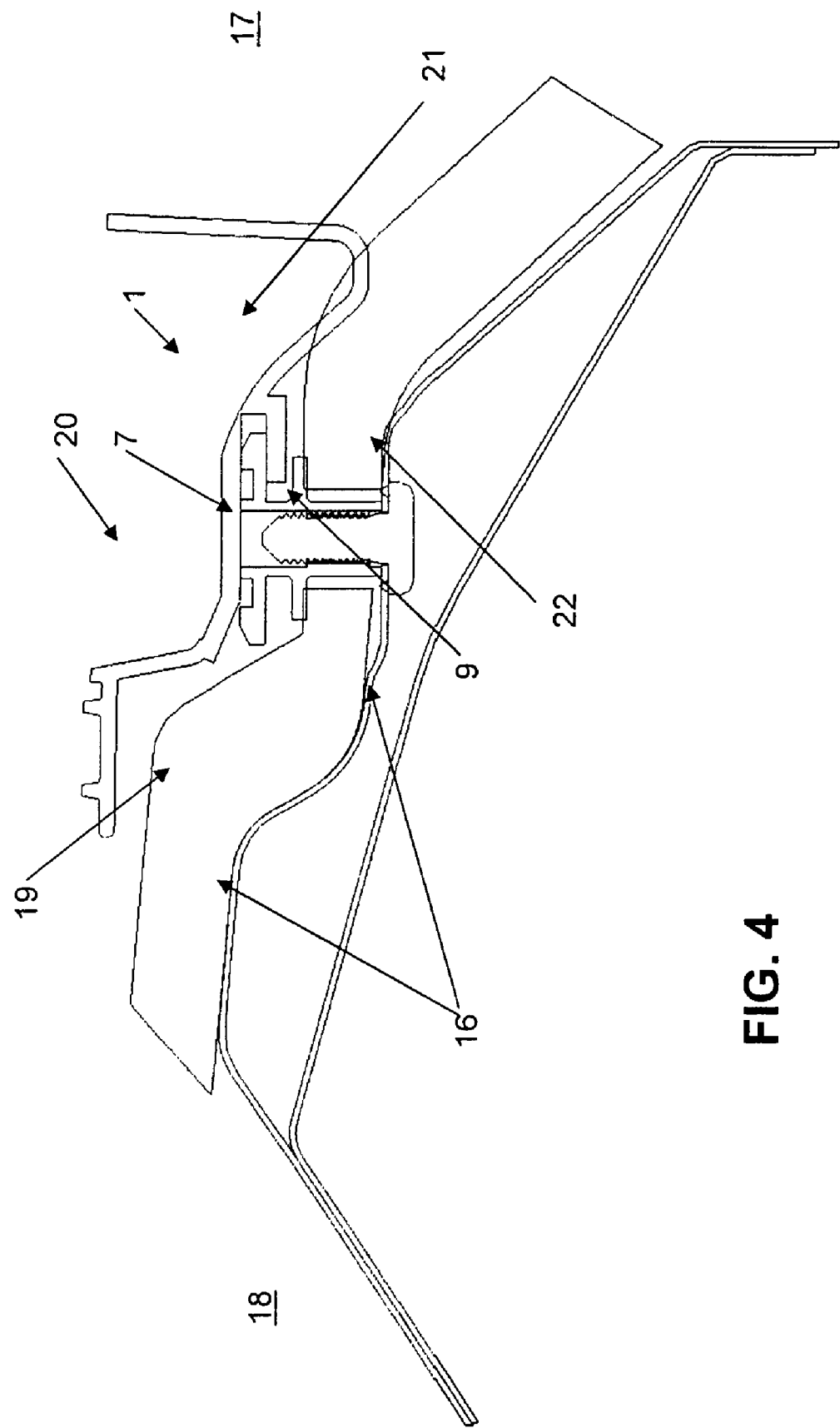
FIG. 4 is a section A-A through FIG. 3.

FIG. 4 shows a section A-A through FIG. 3 viewed in the direction of the arrows. As evident, the front wall 16 has a weld screw 22, and the sound insulation 19 is clamped between the inner disk 9 and the insulation 16. The outer disk 7 is incorporated into the pocket 21. This secures the instrument panel 20 in a vertical direction. The spring elements 10 visible on FIG. 1 are used to offset the tolerance of the outer disk 9 in the pocket 21. As a result, the outer disk 9 does not rattle in the pocket 21, thereby preventing the generation of noise while driving.

The weld screw 22 on FIG. 4 is vertically arranged. This makes it possible to mount the instrument panel 20 with a simple horizontal longitudinal shift, as denoted on FIG. 3 by the arrow P1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A motor vehicle comprising:
    a front wall;
    a weld screw secured to the front wall;
    an attachment element screwed onto the weld screw, the attachment element comprising:
        a central cylinder, having a first and a second end;
        an internal thread at the first end;
        an outer disk configured to terminate the second end also configured to screw down onto the second end; and
        an inner disk between the outer disk and the first end, wherein the inner disk directly presses sound insulation against the front wall; and
    an instrument panel secured to the front wall with the outer disk.

2. The attachment element according to claim 1, wherein the outer disk and inner disk are circular.

3. The attachment element according to claim 1, wherein the outer disk has a depression on the outside, and the cylinder is designed as a hexagon insert bit.

4. The attachment element according to claim 1, wherein the outer disk has recessed spring elements.

5. The attachment element according to claim 1, further comprising spring elements molded onto the outer disk, which have an outwardly curved contact surface, and are held by a notch-shaped elastic element.

6. The motor vehicle according to claim 1 wherein the instrument panel has a U-shaped pocket incorporating the outer disk of the attachment element.

7. The motor vehicle according to claim 1, wherein the weld screw is vertically aligned.

8. The motor vehicle according to claim 1, wherein a diameter of the outer disk is greater than a diameter of the inner disk.

* * * * *